F. G. McCLELLAN.
Hay Rack.
No. 102,023.
3 Sheets—Sheet 1.
Patented April 19, 1870.
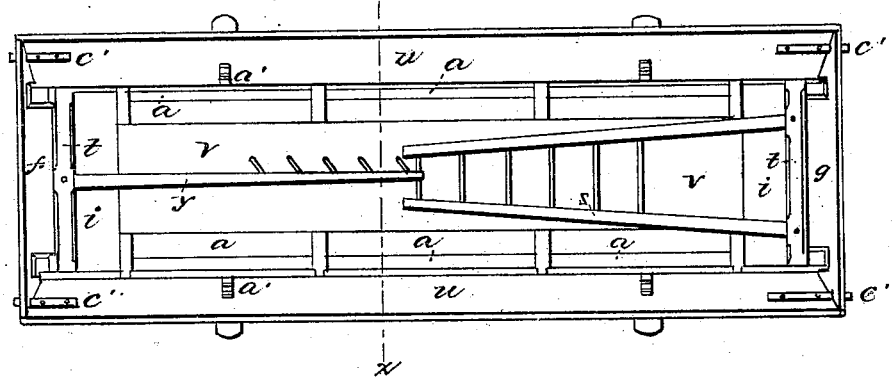
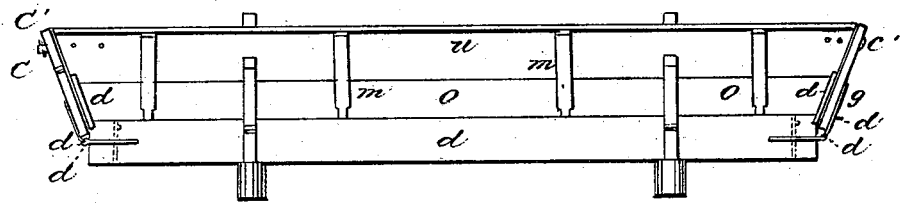
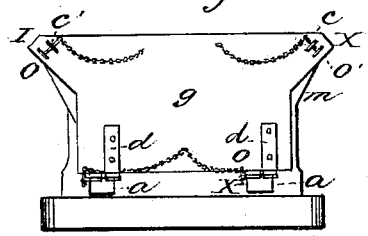
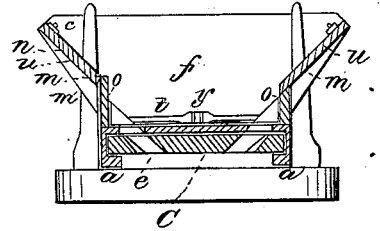
Witnesses:
Inventor:
Felix G. McClellan
by Theodore Mungen
his Attorney F. G. McCLELLAN.
Hay Rack.

Patented April 19, 1870.

Witnesses:

Inventor:
Felix G. McClellan
by Theodore Mungen
his Attorney

F. G. McCLELLAN.
Hay Rack.
No. 102,023.
3 Sheets—Sheet 3.
Patented April 19, 1870.
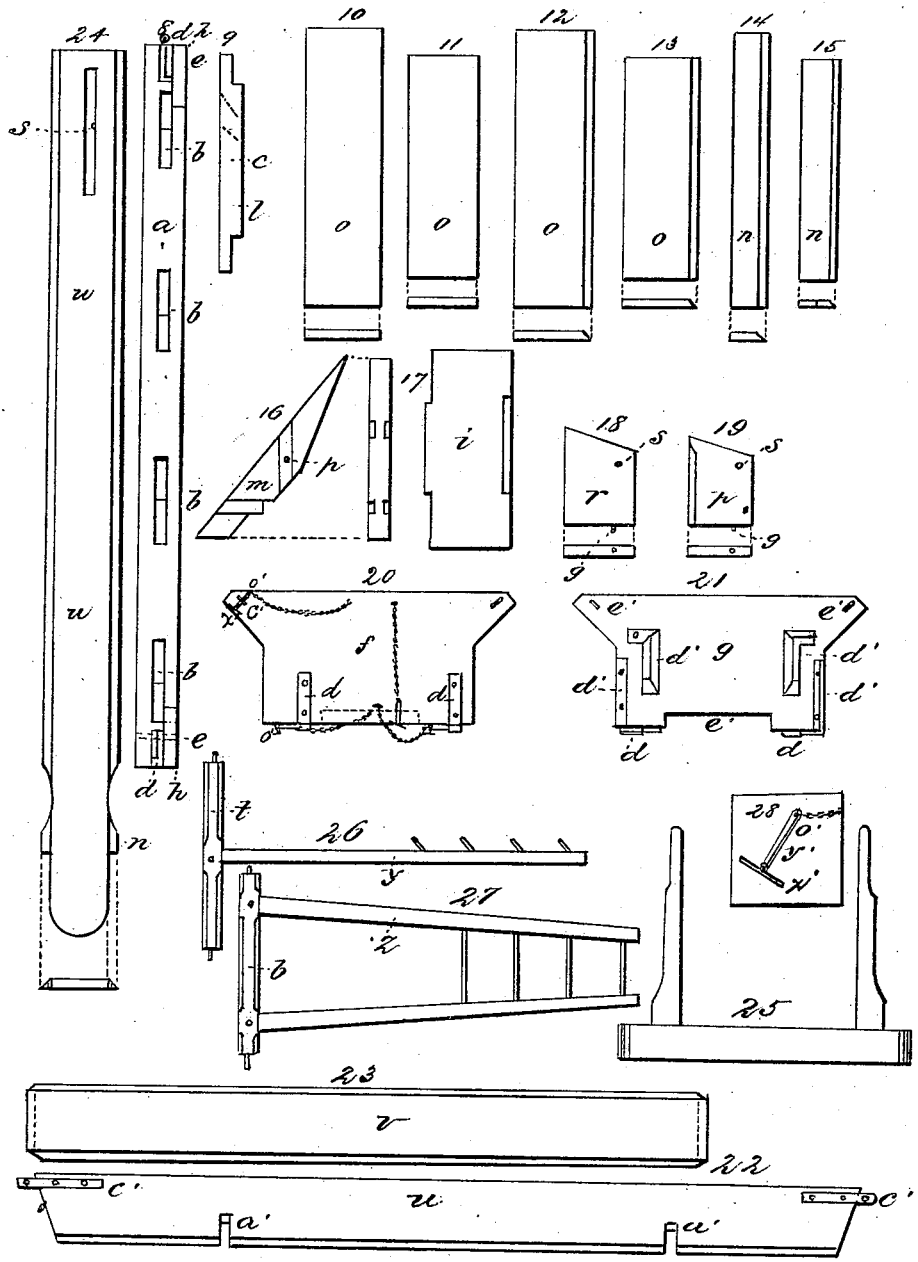
Witnesses:
Inventor:

United States Patent Office.

FELIX G. McCLELLAN, OF ATTICA, OHIO.

Letters Patent No. 102,023, dated April 19, 1870.

---

IMPROVEMENT IN COMBINED HAY-RACK AND WAGON-BOX.

---

The Schedule referred to in these Letters Patent and making part of the same.

---

*To all whom it may concern:*

Be it known that I, FELIX G. McCLELLAN, of Attica, Seneca county, in the State of Ohio, have invented a new and useful Combined Hay-Rack and Wagon-Box, of which the following is a specification.

Nature and Objects of the Invention.

My invention relates to the construction and arrangement of the parts of a combined hay-rack and wagon-box, the object being to produce a hay-rack and wagon-box in combination, of such construction that it can be easily and quickly placed upon the running-gear of a wagon by a single person, needs but few bolts, nails, or pins, is portable, and can be used at pleasure, by slightly rearranging the parts, either as a hay-rack or as a wagon-box.

Description of the Drawings.

Figure 1 is a top view of the combined hay-rack and wagon-box in the first position.

Figure 2 is a side view in the first position.

Figure 3 is an end view of the same.

Figure 4 is a transverse section, showing from the line $x\ x$ in fig. 1 to the rear of the box.

Figure 8 is a side view of one of the sills, showing the mortises on the inside.

Figure 9 is a side view of a cross-piece, showing the tenons that enter the mortises in the sills.

Figure 10 is a view, with transverse section attached, of one of the pieces that form a part of the side of the box.

Figure 11 is a view, with transverse section attached, of a shorter piece used for the same purpose as fig. 10.

Figures 12 and 13 are views with transverse sections attached, of pieces used for the same purpose that figs. 10 and 11 are used, differing only in having the upper edges beveled.

Figures 14 and 15 are views, with transverse sections attached, of pieces, having the inner edges beveled on the upper side, used to form a portion of the bottom of the box.

Figure 16 is a view of the side and of the edge of one of the inclined braces, having a vertical and a horizontal gain on each side, and a tenon at the lower end.

Figure 17 is a view of one of the pieces used at each end, to form a portion of the bottom of the box, when the invention is in the first position.

Figures 18 and 19 are views of pieces, with transverse sections attached, used to form a portion of the side of the box near its ends.

Figure 20 is an exterior view of an end gate of the box.

Figure 21 is an interior view of the same.

Figure 22 is a view of one of the side boards of the box.

Figure 23 is a view of the bottom board used in the first position.

Figure 24 is a view of the bottom board used in the second position.

Figure 25 is a view of the bolster and stakes.

Figures 26 and 27 are views of the devices used to hold the spring-pole in place upon the hay.

Figure 5:
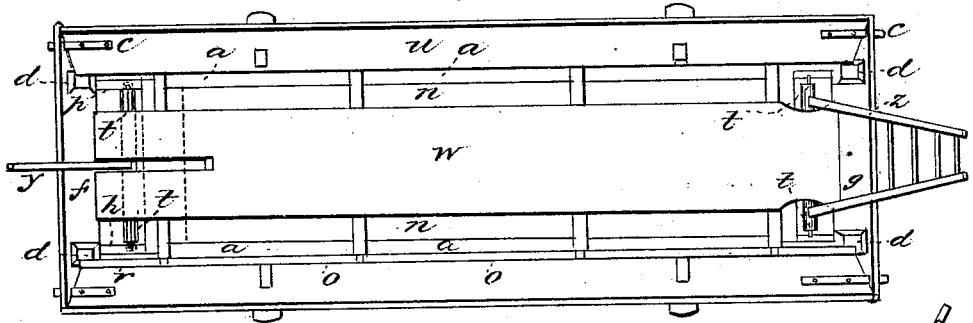
Figure 5 is a top view of the combined hay-rack and wagon-box in the second position.
Figure 6:
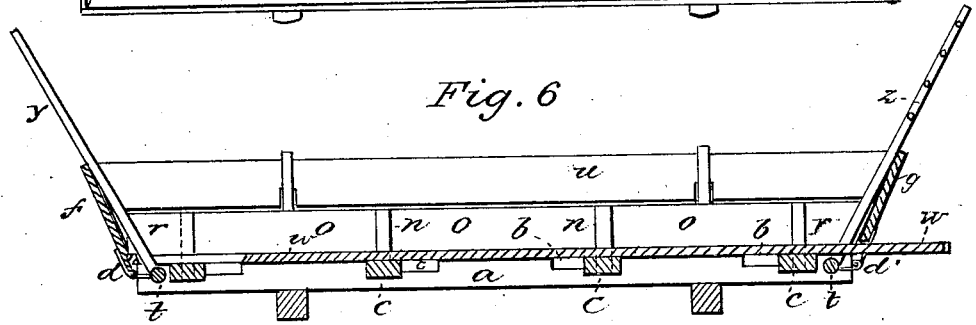
Figure 6 is a longitudinal section of the same.
Figure 7:
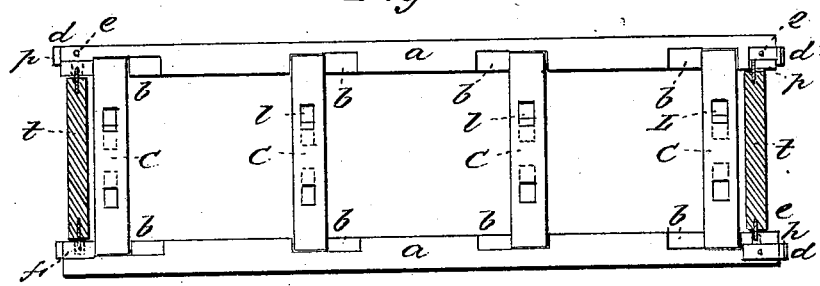
Figure 7 is a longitudinal section of the sills and of the rollers in the sills, and a top view of the cross-pieces in the sills.

General Description.

The sills $a$ have mortises $b$ on the inside, into which the tenons of the cross-pieces $c$ are fitted; the tenons at one end of the cross-pieces $c$ are longer than those at the other; the mortises $b$ are twice the width of the tenons on the cross-pieces $c$, but are same thickness; the inner half of each mortise in one of the sills is deeper, just the length of the short tenons of the cross-pieces $c$, than the outer half of the same mortise; the depth of the mortises in the other sill are the length of the short tenons; the long tenons are twice the length of the short ones. A part of the hinge $d$ is let into the end of the sill $a$ as far as the eye of the hinge, and fastened by the pin $e$; the other part of the hinge $d$ is fastened to the end gates $f$ and $g$.

Rabbets $h$ are cut in the inner upper edges of the sills $a$ at their ends to receive the bottom pieces $i$; the sills $a$ have slots $j$, to receive the ends of the rollers $k$; the roller, having two mortises in it, is placed at the front of the wagon. The mortises $l$ in the cross-pieces $c$ receive the tenons of the braces $m$; the braces $m$ are provided on each side with a vertical and a horizontal gain. The horizontal gain receives the ends of the bottom pieces $n$; the vertical gains receive the ends of the side pieces $o$. The end braces $m$ are provided with holes $p$, to receive the pins $q$ in the end of the side pieces $r$.

The side pieces $r$ are provided with holes $s$, for the reception of the ends or pivots of the rollers $t$; the rollers $t$ are longer than the rollers $k$. The side pieces $o$ are six in number, three for each side of the box; one of the pieces, in the drawing, is represented longer than than the other two, and is placed between them. The side pieces $o$ and $r$ are shown with their upper edges straight, and also beveled on the inside; the object of beveling the edges is to allow the side boards $u$ to lap over them, and to prevent them from working up and down in the vertical gains in the braces $m$.

The bottom board $v$ is used when the invention is in the first position; the bottom board $w$ is used when the invention is in the second position. The rack-bar $y$ and ladder $z$ are mortised into the rollers $t$ and fastened by pins, so that they can be removed at pleasure.

they are used in the rollers $t$ in the first position, and transferred to the rollers $k$ in the second position.

The side boards $u$ have the notches $a'$, to receive the standards or stakes, and have the iron straps $c'$, which enter holes in the upper corners of the end gates $f$ and $g$. Four bolts are fastened by chains to the outside of each of the end-gates $f$ and $g$, two of the bolts pass through eyes in the points of the iron straps $c'$, and two through eyes in the points of the bolts in the hinges $d$. The end gates $f$ and $g$ have the cleats $d'$ on the inside. The end-gate $g$ is used at the front of the box, and has a recess, $e'$, cut in the lower edge, to receive the projection on the bottom piece $i$ used in the first position, and through which the rounded end of the bottom board $w$ used in the second position, protrudes as far as the shoulder $n'$ will permit.

The end-gate $f$, used at the rear of the box, has a rabbet cut in the lower edge on the inside, to receive the projection of the bottom piece $i$ used in the first position, and also the end of the bottom board $w$ in the second position. The bottom pieces $n$ have their inner edges beveled on the upper side; the bottom board $v$ has its edges beveled on the under side, and its ends beveled on the upper side; the bottom pieces $i$ have beveled recesses in their inner edges on their under sides, which receive the beveled ends of the bottom board $v$. The bottom board $w$ has the edges beveled on the under side and curved just back of the shoulders $n'$, to allow the foot of the ladder $z$ to enter the mortises in the front roller $k$. It also has the opening $s'$, to admit of inserting the rack-bar $y$ into the mortise in rear roller $k$.

Arrangement of the Parts.

Place the sills $a$ upon the bolsters, insert the long tenons of the cross-pieces $c$ into the deeper half of the mortises $b$ in one sill, $a$, and the short tenons into the mortises $b$ in the other sill, then push the cross-pieces $c$ from the inner half to the outer half of the mortises $b$, put the ends of the rollers $k$ into the slots $j$, and push them toward the ends of the sills; set the inclined braces $m$ in the mortises $l$ in the cross-pieces $c$, placing the braces $m$, having the holes $p$ in the vertical gains, into the end cross pieces $c$, slide the bottom pieces $n$ into the horizontal gains in the braces $m$; next put the bottom board $v$ in place upon the cross-pieces $c$, slide the bottom pieces $i$ into the rabbets $h$ at the ends of the sills $a$; slide the side pieces $o$ into the vertical gains in the braces $m$; place the side boards $u$ upon the braces $m$, letting the stakes enter the notches $a'$; place the end-gate $g$ on at the front of the box; put the two lower bolts on the end gates, into the eyes in the point of the hinge-bolt; put the end gate $f$ on at the rear of the box; insert the pins $q$ of the side pieces $r$ into the holes $p$ in the vertical gains in the braces $m$; insert the ends of the rollers $t$ into the holes $s$ in the side pieces $r$; close the end-gates $f$ and $g$, letting the points of the iron straps $c'$ pass through the holes in the upper corners of the end gates; insert the two upper bolts on each end gate into the eyes in the points of the iron straps $c'$; place the rack-bar $y$ and ladder $z$ into the mortises into the rollers $t$, and pin them, and the invention is in the first position.

Remove the rollers $t$, rack-bar $y$, and ladder $z$, and the wagon-box is produced by itself. Remove the bottom pieces $i$ and bottom board $v$; substitute the bottom board $w$, and place the rack-bar $y$ and ladder $z$ in the mortises in the rollers $k$, and the invention is in the second position.

In order to place the bottom board $w$ in position, close the end gate $g$, push the rounded end of the bottom board $w$ through the recess $e'$ in the end gate $g$ as far as the shoulder $n'$ will permit it to go, then close the end gate $f$. The rounded end of the bottom board $w$, which projects from the front of the box, serves as a step to enable the driver to climb upon the load of hay.

Claims.

I claim as my invention—

1. The combination of the sills $a$, cross-pieces $c$, rollers $t$ with rack-bar $y$ and ladder $z$, braces $m$, bottom pieces $i$ and $n$, side pieces $o$ and $r$, bottom boards $v$, side boards $u$, and end gates $f$ and $g$, substantially as and for the purposes hereinbefore specified.

2. The combination of the sills $a$, cross-pieces $c$, rollers $k$ with rack-bar $y$ and ladder $z$, braces $m$, bottom pieces $n$, side pieces $o$ and $r$, bottom board $w$, side boards $u$, and end gates $f$ and $g$, substantially as and for the purposes hereinbefore specified.

3. The combination of the sills $a$, cross-pieces $c$, braces $m$, bottom board $v$, bottom pieces $i$ and $n$, side pieces $o$ and $r$, side boards $u$, and end gates $f$ and $g$, substantially as and for the purposes hereinbefore specified.

In testimony that I claim the foregoing combined hay-rack and wagon-box, as above described, I have hereunto set my hand and seal this 20th day of January, 1870.

F. G. McCLELLAN.

Witnesses:
  HUGH R. STOCKMAN,
  W. H. PARKER.